United States Patent [19]

Kakuta

[11] Patent Number: 4,894,525

[45] Date of Patent: Jan. 16, 1990

[54] OPTICAL POWER CONTROL DEVICE FOR SEMICONDUCTOR LIGHT EMITTING ELEMENT

[75] Inventor: Yoshiyuki Kakuta, Saitama, Japan

[73] Assignee: Pioneer Electronic Corporation, Tokyo, Japan

[21] Appl. No.: 326,771

[22] Filed: Mar. 21, 1989

[30] Foreign Application Priority Data

Sep. 16, 1988 [JP] Japan .................................. 63-231893

[51] Int. Cl.$^4$ ............................................... G01J 1/32
[52] U.S. Cl. ...................................... 250/205; 315/158
[58] Field of Search ................ 250/205; 358/400, 401; 315/151, 158

[56] References Cited

U.S. PATENT DOCUMENTS 4,796,250  1/1989  Kobayashi et al. .................. 250/205

Primary Examiner—David C. Nelms
Attorney, Agent, or Firm—Sughrue, Mion, Zinn, Macpeak & Seas

[57] ABSTRACT

In an optical power control device for a semiconductor light emitting element, a voltage corresponding to a write power set value is modified with write data and then is averaged. The resultant averaged voltage is subtracted from the averaged voltage of the optical power detection voltage, so that the drive current of the semiconductor light emitting element is controlled in accordance with the difference of the resultant subtraction voltage from the read power set value. As a result, even when the write power has been outputted for a long period of time, it can be switched over to the read power instantaneously. By employing simple switching circuitry, the control device is free from the occurrence of drifts or the adjustment of offsets.

6 Claims, 3 Drawing Sheets

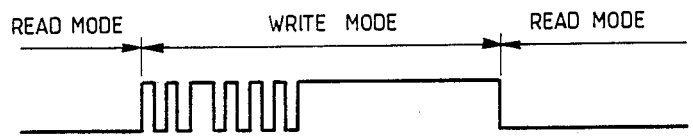
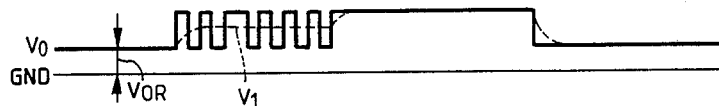
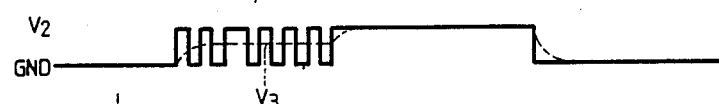
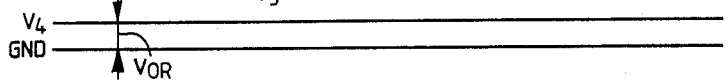
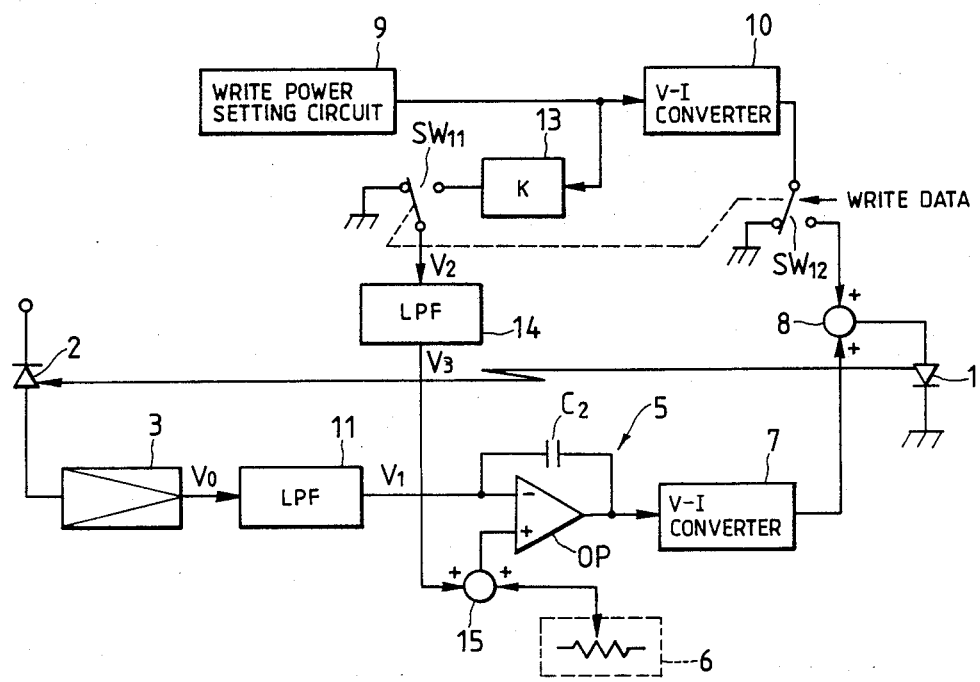

OPTICAL POWER CONTROL DEVICE FOR SEMICONDUCTOR LIGHT EMITTING ELEMENT

BACKGROUND OF THE INVENTION

This invention relates to an optical power control device for a semiconductor light emitting element.

One example of a conventional optical power control device is shown in FIG. 1. A laser diode 1, which is a semiconductor light emitting element, is employed as a light source for emitting a light beam for writing data on or reading data from a recording medium. A monitor diode 2 is built into the laser diode 1. The monitor diode 2, which acts as a photodetector, receives part of the output laser beam of the laser diode.

The output of the monitor diode 2 is applied through a monitor amplifier 3 to a sample and hold circuit 4. The sample and hold circuit 4 includes a switch $SW_1$ connected to the output terminal of the monitor amplifier 3 and a capacitor $C_1$ connected between the output terminal of the switch $SW_1$ and ground. In response to a write gate signal which is outputted by a controller (not shown) during a data writing interval, the switch $SW_1$ is turned off (or opened) in a write mode, and is turned on (or closed) in a read mode.

The output of the sample and hold circuit 4 is applied to the inverting input of an operational amplifier OP which forms an integrator 5 together with a capacitor $C_2$. A voltage corresponding to a read power set value provided by a read power setting circuit 6 is applied to the non-inverting input terminal of the operational amplifier OP. so that the integrator 5 outputs a voltage corresponding to the difference between the output voltage of the sample and hold circuit 4 and the voltage corresponding to the read power set value. The output voltage of the integrator is applied to a V-I (voltage to current) converter 7, where it is converted into a current which is applied through an adder 8, as a write current, to the laser diode 1.

The laser power must be greater in the data writing mode than in the data reading mode. The laser power for writing is set by a write power setting circuit 9, which outputs a voltage corresponding to the write power set value. The output voltage of the write power setting circuit 9 is applied to a V-I (voltage to current) converter 10, where it is converted into a current which is supplied to a switch $SW_2$.

In the data reading mode, the armature of the switch $SW_2$ is connected to one contact which is grounded, and in the data writing mode the switch is turned on and off in accordance with the data which is to be written. The output current of the switch $SW_2$, being superposed, as a write current, on the read current at the adder 8, is supplied to the laser diode 1.

The above-described sample and hold type optical power control device is designed so that, in the data writing mode, the optical power detection voltage of the monitor diode in the data reading mode occurring immediately before the data writing mode is stored in the capacitor $C_1$, and the voltage corresponding to the write power set value is added to the stored voltage. Therefore, no trouble results in the case of a recording format in which, as in a data recording operation, there is a switchover from writing power to reading power.

However, the above-described device is disadvantageous in that, for instance in recording data over a long interval, it is impossible to hold the optical power detection voltage in the data reading mode because of the discharge of the capacitor $C_1$. and therefore it is impossible to instantaneously switch the data writing mode over to the data reading mode.

Instead of the sample and hold circuit 4, analog-to-digital (A/D) and digital-to-analog (D/A) converters may be employed. However, even with such structure, if there is a long data writing time, then because of heat generated by the laser diode 1, the current vs. optical power characteristic curve changes. As a result, it is impossible to hold the optical power detection voltage obtained in the data reading mode. Thus, similarly as in the above-described case, it is impossible to instantaneously switch the data write mode over to the data read mode.

Another example of a conventional optical power control device is disclosed in Japanese Unexamined Published Patent Application (OPI) No. 146457/1984. In the conventional device, the average value of write data is obtained, and the product of the average value and the write power set value is subtracted from the optical power detection voltage of the photodetector in order to stabilize the system. However, such a device is deficient in that, since it is designed to use a multiplier for obtaining the product of the write data average value and the write set value, drift may occur, and offset adjustment may be required.

SUMMARY OF THE INVENTION

Accordingly, one object of this invention is to provide an optical power control device for a semiconductor light emitting element in which, even when writing power is outputted for a long time, the data writing mode can be switched over to the data reading mode instantaneously.

Another object of the invention is to provide an optical power control device for a semiconductor light emitting element which exhibits no drift Which does not require offset adjustment is not required.

The foregoing and other objects of the invention have been achieved by an optical power control device for a semiconductor light emitting element, the element including light detecting circuitry for receiving part of a light beam emitted by the semiconductor light emitting element, to control the optical power of the semiconductor light emitting element in accordance with the detection output of the light detecting circuitry. The device includes circuitry for supplying to the semiconductor light emitting element a read current corresponding to a read power set value; first averaging circuitry for averaging the output signal of the light detecting circuitry; first modulating circuitry for modulating a signal corresponding to a write power set value with write data; second averaging circuitry for averaging the output signal of the first modulating circuitry; subtractor means for subtracting the output signal of the second averaging circuitry from the output signal of the first averaging circuitry; circuitry for controlling the read current in accordance with the difference between the subtraction output of the subtractor circuitry and the read power set value: second modulating circuitry for modulating a write current corresponding to the write power set value with the write data; and circuitry for superposing the output current of the second modulating circuitry on the read current.

BRIEF DESCRIPTION OF THE DRAWINGS

The nature, principles and utility of the invention will become more apparent from the following detailed description when read in conjunction with the accompanying drawings, in which:

FIGS. 4A-4D are time charts showing waveforms of various signals in the circuit shown in FIG. 1; and FIG. 5 is a block diagram showing a second example of the optical power control device according to the invention.

DETAILED DESCRIPTION OF THE PREFERRED EMBODIMENTS

Preferred embodiments of this invention now will be described in detail with reference to the accompanying drawings.

Figure 1:
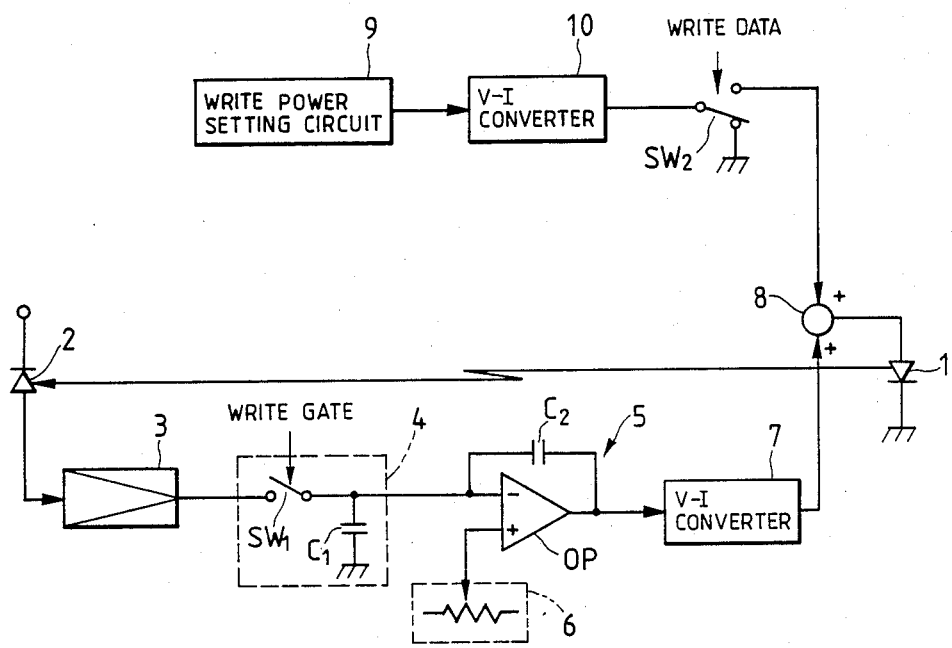
FIG. 1 is a block diagram showing a conventional optical power control device for a semiconductor light emitting element.
Figure 2:
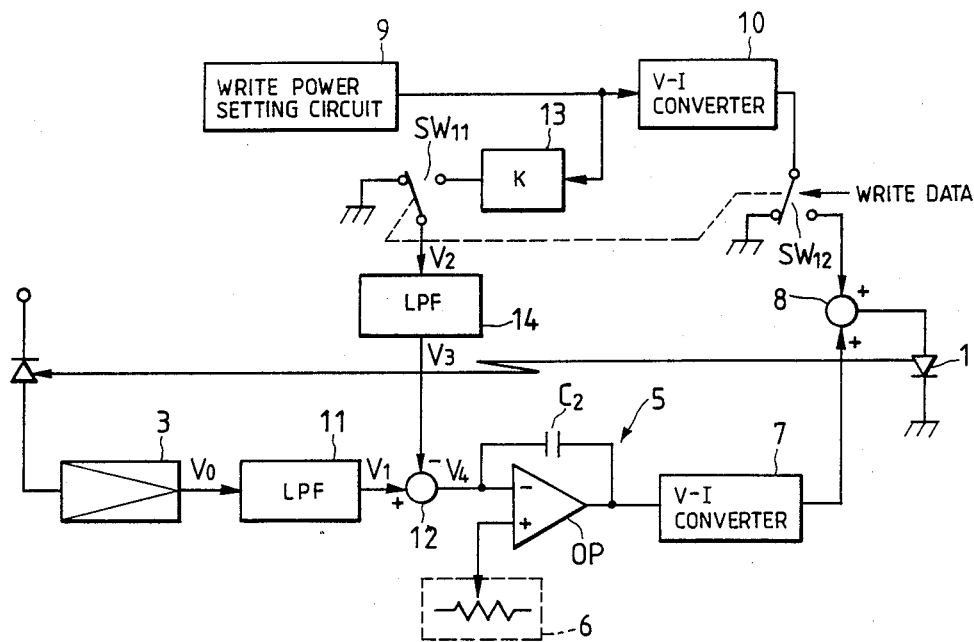
FIG. 2 is a block diagram showing a first example of an optical power control device for a semiconductor light emitting element according to this invention.

A first example of an optical power control device for a semiconductor light emitting element according to the invention is as shown in FIG. 2, in which circuit elements corresponding functionally to those which have been previously described with reference to FIG. 1 are designated by the same reference numerals or characters.

In the control device of FIG. 2, an optical power detection voltage outputted by a monitor diode 2 is applied through a monitor amplifier 3 to first averaging circuitry (in this case, a low-pass filter (LPF) 11). where it is averaged. The output voltage $V_1$ of the LPF 11 is applied, as one input, to a subtractor 12. On the other hand, a voltage corresponding to a writing power set value outputted by a write power setting circuit 9 is applied through an amplifier 13 having a gain K to first modulating circuitry (in this case, a switch $SW_{11}$) The switch $SW_{11}$ operates in association with second modulating circuitry (in this case, a switch $SW_{12}$) which modulates a current corresponding to the write power set value in accordance with the data to be written.

The armature of the switch $SW_{11}$ is positioned at its ground contact in a data reading mode. In a data writing mode, the switch $SW_{11}$ turns on and off the output voltage of the amplifier 13; that is, it applies the output voltage to second averaging circuitry (in this case, a low-pass filter (LPF) 14) while modulating it, so that the output voltage is averaged. The output voltage $V_3$ of the LPF 14 is applied, as a subtracting input, to the subtractor 12. The subtraction output ($V_1-V_3$) of the subtractor 12 is applied to an integrator 5, where the difference between the subtraction output and a voltage corresponding to a read power set value is detected.

In FIG. 1, the switches $SW_{11}$ and $SW_{12}$ are mechanical switches; however, it goes without saying that they can be replaced by conventional electronic switch circuits. The lowpass filters 11 and 14 have the same cut-off frequency.

Figure 3:
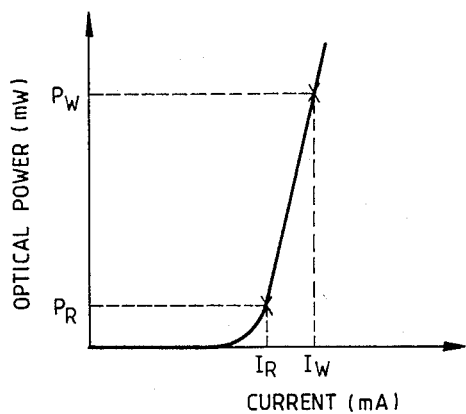
FIG. 3 is a graphical representation indicating a current vs optical power characteristic curve of a laser diode in the optical power control device of the invention.

If the coupling efficiency of the laser diode 1 and the monitor diode 2 is represented by $\eta$; the sensitivity (A/W) of the monitor diode 2, by S; the equivalent resistance ($\Omega$) of the monitor amplifier 3, by R; and the efficiency of the V-I converter 10 in the write system, by D, and if, in a laser diode (1) with a current vs optical power characteristic is shown in FIG. 3, the writing power is represented by $P_W$; the reading power, by $P_R$; the current with the writing power $P_W$, by $I_W$; and the current with the reading power $P_R$ by $I_R$, the gain K of the amplifier 13 should be determined as follows:

$$V_1 - V_{OR} = V_3$$

where $V_{OR}$ is the output voltage $V_0$ of the monitor amplifier 3 in the data read mode.
That is, $$(P_W - P_R) \times \eta \times S \times R = ((I_W - I_R)/D) \times K$$

Therefore,
$$K = ((P_W - P_R)/(I_W - I_R)) \times D \times \eta \times S \times R$$

where $(P_W - P_R)/(I_W - I_R)$ is the differential quantum efficiency.

The operation of the just-described optical power control device will be described with reference to the waveform diagrams of FIGS. 4A-4D. In the control device, switching between the reading mode and the writing mode is accomplished by input write data; that is, the data intervals of write data (FIG. 4A) are the writing periods, and the other intervals are the reading periods.

In the read interval, the armatures of the two switches $SW_{11}$ and $SW_{12}$ are positioned at the grounding contacts, so that a read current corresponding to the read power set value determined by the read power setting circuit 6 is supplied to the laser diode 1. Under this condition, the optical power detection voltage detected by the monitor diode 2 is supplied through the monitor amplifier 3 to the LPF 11, where it is averaged. The output of the LPF 11 is applied to the subtractor 12.

The optical power detection voltage $V_O$ (FIG. 4B) passed through the monitor amplifier 3 is a substantially constant voltage $V_{OR}$ in the read mode, and the output voltage $V_2$ (FIG. 4C) of the switch $SW_{11}$ is zero. Therefore, the averaged voltage of the LPF 14 is zero, and its value $V_{OR}$ is the output voltage $V_4$ (FIG. 4D) of the subtractor 12. The read current is increased or decreased according to the difference of the output voltage $V_4$ and the voltage corresponding to the read power set value, so that the optical power of the laser diode 1 is maintained unchanged.

In the write period, the switches $SW_{11}$ and $SW_{12}$ are turned on and off repeatedly according to the write data (FIG. 4A) as a result of which a pulse waveform voltage obtained by superposing a pulse waveform in the write mode on the constant volta in the read mode is outputted as the output voltage V (FIG. 4B) of the monitor amplifier 3. As the pulse waveform voltage $V_O$ passes through the LPF 11, an averaged voltage as indicated by the broken line in FIG. 4B is provided as the output voltage $V_1$ of the LPF 11.

On the other hand, the voltage corresponding to the write power set value is turned on and off according to the write data (FIG. 4A). thus providing a pulse waveform voltage i.e. the output voltage $V_2$ (FIG. 4C) of the switch $SW_{11}$. As the output voltage $V_2$ passes through the LPF 14, an average voltage as indicated by the broken line in FIG. 4C is provided as the output voltage $V_3$ of the LPF 14. When the aforementioned average voltage $V_1$ is subtracted from the average voltage $V_3$, the constant voltage $V_{OR}$ in the read mode is obtained as the output voltage, $V_4$ (FIG. 4D) of the subtractor 12. That is, the output voltage $V_4$ of the subtractor 12 is maintained unchanged both in the reading mode and in the writing mode.

It goes without saying that, in the writing mode, similarly as in the reading mode, the read current is controlled (increased and decreased) according to the difference of the output voltage $V_4$ (FIG. 4D) of the subtractor 12 and the voltage corresponding to the read power set value.

As described above, the voltage corresponding to the write power set value is modulated with the write data (the FIG. 4A) and averaged, and the resultant average voltage $V_3$ is subtracted from the average voltage $V_1$ of the optical power detection voltage $V_O$. As a result, both in the reading mode and in the writing mode, the same constant voltage $V_{OR}$ is obtained as the subtraction voltage $V_4$. Accordingly, the reading mode can be switched over to the writing mode instantaneously, and vice versa, and even when writing power has been outputted for a long period of time, it can be switched over to reading power instantaneously.

Furthermore, the optical power control device employs simple switching circuitry (or the switch $SW_{11}$) as described above. Therefore, in the optical power control device of the invention, unlike the conventional one using the multiplier disclosed by the aforementioned Japanese Patent (OPI) No. 146457/1984, no drift occurs and no offset adjustment is required.

In addition, when the switch ($SW_{11}$) for write power set value and the switch ($SW_{12}$) for data writing are replaced with equivalent switching circuits, then the errors caused by these switching means can be cancelled out.

In the above-described optical power control device, the average voltage $V_3$ is subtracted from the average voltage $V_1$, and the resultant subtraction output is applied to the inverting input terminal of the operational amplifier OP forming the integrator 5. However, the same effect can be obtained by modifying the control device as shown in FIG. 5. That is, the average voltage $V_3$ is applied to an adder 15, where it is added to the voltage corresponding to the read power set value' and the resultant addition output is applied to the non-inverting input terminal of the operational amplifier OP. The average voltage $V_1$ is applied directly to the inverting input terminal of the operational amplifier OP.

As described above, in the optical power control device of the invention, the voltage corresponding to the write power set value is modified with the write data and then averaged, and the resultant averaged voltage is subtracted from the averaged voltage of the optical power detection voltage. The difference of the resultant subtraction voltage from the read power set value (or target value) is utilized to control (increase and decrease) the drive current of the semiconductor light emitting element. Therefore, the same subtraction voltage is provided both in the reading mode and in the writing mode. Accordingly, the reading mode can be switched over to the writing mode instantaneously' and vice versa, and even when the write power has been outputted for a long period of time, it can be switched over to the read power instantaneously. Furthermore, employing the simple switching means, the optical power control device of the invention is free from the occurrence of drifts or the adjustment of offsets.

While preferred embodiments of the invention have been described, it will be obvious to those skilled in the art that various changes and modifications may be made therein without departing from the invention. Therefore, the appended claims cover all such changes and modifications as fall within the true spirit and scope of the invention.

What is claimed is:

1. An optical power control device for a semiconductor light emitting element, said element including light detecting means for receiving part of a light beam emitted by said element to control the optical power of said element according to a detection output of said light detecting means' said device comprising:

means for supplying to said element a read current corresponding to a read power set value;

first averaging means for averaging said detection output to produce a first averaged signal;

first modulating means for modulating a signal corresponding to a write power set value with write data to produce a first modulated signal;

second averaging means for averaging said first modulated signal to produce a second averaged signal;

subtractor means for subtracting said second averaged signal from said first averaged signal to produce a subtraction output:

means for controlling said read current according to the difference of said subtraction output and said read power set value;

second modulating means for modulating a write current corresponding to said write power set value with said write data to produce a second modulated signal; and means for superposing said second modulated signal on said read current.

2. An optical power control device as claimed in claim 1, in which said first and second modulating means respectively comprises first and second switching means which is turned on and off in accordance with said write data.

3. An optical power control device as claimed in claim 2, wherein said first and second switching means each comprises a mechanical switch.

4. An optical power control device as claimed in claim 2, wherein said first and second switching means each comprises an electronic switch.

5. An optical power control device as claimed in claim 1, wherein said first and second averaging means each comprises a first and second low-pass filter.

6. An optical power control device as claimed in claim 5, wherein said first and second low-pass filters have the same cut-off frequency.

* * * * *